United States Patent [19]
Katsen et al.

[11] Patent Number: 5,746,817
[45] Date of Patent: May 5, 1998

[54] INK JET INK COMPOSITION

[75] Inventors: Boris Joseph Katsen, Longmeadow; Richard S. Himmelwright, Wilbraham; Barbara Jones Stewart, Springfield; Nate R. Schwartz, South Hadley, all of Mass.

[73] Assignee: Rexam Graphics Inc., South Hadley, Mass.

[21] Appl. No.: 698,867

[22] Filed: Aug. 16, 1996

[51] Int. Cl.$^6$ .................................. C09D 11/02
[52] U.S. Cl. .................. 106/31.65; 106/31.85; 106/31.86
[58] Field of Search ................ 106/31.65, 31.85, 106/31.86

[56] References Cited

U.S. PATENT DOCUMENTS

| | | | |
|---|---|---|---|
| 4,188,236 | 2/1980 | Robertson et al. | 106/504 |
| 5,026,427 | 6/1991 | Mitchell et al. | 106/31.6 |
| 5,310,778 | 5/1994 | Shor et al. | 106/31.65 |
| 5,344,487 | 9/1994 | Whalen-Shaw | 106/31.65 |

*Primary Examiner*—Helene Klemanski
*Attorney, Agent, or Firm*—Burns, Doane, Swecker & Mathis, L.L.P.

[57] ABSTRACT

Provided is an ink jet ink comprised of water, pigment, a water immiscible organic compound exhibiting a high boiling point, and a water miscible compound. The combination of the water immiscible compound and the water miscible compound provides for excellent anti-crusting properties, and provides an ink which upon printing makes a round dot, and which printed images exhibit excellent waterfastness, lightfastness and wet rub resistance.

32 Claims, 8 Drawing Sheets

Image Analysis of Single Ink Jet Dots

Pigmented Ink
average diameter = 102 (m) and 110 (cmy)
mean aspect ratio = 1.06 (m) and 1.12 (cmy)

Dye Based Inks
average diameter = 120 (m) and 125 (cmy)
mean aspect ratio = 1.39 (m) and 1.29 (cmy)

Image Analysis of Single Ink Jet Dots magenta  process black

Pigmented Ink
average diameter = 102 (m) and 110 (cmy)
mean aspect ratio = 1.06 (m) and 1.12 (cmy)

Dye Based Inks
average diameter = 120 (m) and 125 (cmy)
mean aspect ratio = 1.39 (m) and 1.29 (cmy)

FIG. 4 Cyan Line Analysis (Imaged on HP Premium Paper)

INK JET INK COMPOSITION

BACKGROUND OF THE INVENTION

The present invention relates to an improved ink jet ink, and in particular a pigmented ink jet ink. The present invention relates to pigmented ink jet inks which exhibit excellent printing properties. The present invention also relates to pigmented ink jet inks which provide images exhibiting excellent water and lightfastness.

Ink jet recording systems are advantageous in that they make very little noise when recording, can be readily matched to color recording, and can also obtain the recorded image with high resolution at a high speed. Inks which are suitable for use in an ink jet printing system should display a consistent drop breakup length, drop velocity and, for synchronous ink jet printing, drop charge under set operating conditions. Conventional ink jet inks are complex multi-component systems based on water soluble dye(s), further containing polymers, solubilizing agents, chelating agent and biocides.

Several drawbacks plague the use of dye-containing, water-based inks. Dyes are not as lightfast and waterfast as pigments. Furthermore, the water solubility of the dyes limits their use in that the images cannot get wet or be used outdoors. Dyes also tend to wick and bleed into uncoated and rough papers. The degree of spreading depends upon the paper used. Thus, the range of paper which can be used with dye-based inks is limited. In addition there is a loss in image resolution due to feathering and intercolor bleeding of image characters on the paper.

Because of the limitations of the water-soluble dye approach, researchers have worked with pigment-based inks. Although pigment-based inks are more lightfast and waterfast and can be used with a wide range of printing media such as paper, coated paper, transparent and white polyesters and vinyls, and various types of synthetic paper and castcoated materials, it is still very difficult to obtain particles small enough which do not settle and clog the orifice of the printing system. The orifice must remain open for a wide range of operating conditions, e.g., temperature and humidity. Problems of feathering, migration and image loss can also occur with pigment inks.

Conventional processes for preparing pigment-based ink jet inks include blending ink jet materials together and then mixing and grinding with a known dispersing device such as a ball mill, homogenizer, sand mill or roll mill. U.S. Pat. No. 4,597,794 describes a process wherein the pigmented ink jet ink is prepared by dispersing fine particles of pigments in an aqueous dispersion medium containing a polymer having both a hydrophilic and hydrophobic construction portion. The components were prepared using the aforementioned standard processes.

U.S. Pat. No. 5,026,427 relates to a process for making pigmented ink jet inks. The process involves mixing at least one pigment and at least one pigment dispersant in a medium comprised of water or water in a water soluble organic solvent. The pigmented ink mixture is then deflocculated by passing it through a microfluidizer.

U.S. Pat. No. 5,160,370 relates to a pigmented ink which involves a pigment, a water soluble resin, a water soluble organic solvent and water. The water soluble resin is added in an amount such that the amount of resin not absorbed on the pigment is about two percent or less. Furthermore, the water soluble organic solvent comprises at least one polyhydric alcohol and an aliphatic monohydric alcohol, such as ethanol.

Due to the complex nature of the composition of an ink, the composition and the method used to produce the ink can be quite sensitive. There is a need in the industry to improve the inks used. Despite the ongoing attempts to solve many of the problems which exist, there is still a need to improve the pigmented inks used in ink jet printers, both from the standpoint of the image printed and the printability of the inks.

Accordingly, one object of the present invention is to provide a novel ink jet ink composition.

Another object of the present invention is to provide an ink jet ink composition which demonstrates improved printability.

Yet another object of the present invention is to provide an ink jet ink which prints an image of high density and with high resolution.

Still another object is to provide such an ink jet ink which prints an image exhibiting excellent water and lightfastness.

Another object of the present invention is to provide a process for preparing such a novel pigmented ink jet ink.

These and other objects of the present invention will become apparent upon a review of the following specification and the claims appended thereto.

SUMMARY OF THE INVENTION

In accordance with the foregoing objectives, provided is an ink jet ink comprised of water, pigment, a water immiscible organic compound exhibiting a high boiling point, preferably greater than 280° C., and a water miscible compound, with at least part of the water immiscible compound being absorbed on the pigment. It has been found that the presence of the water immiscible organic compound together with the water miscible compound provides an ink jet ink which avoids plugging problems, and exhibits excellent drying times on the surface, particularly paper, it is printed. Furthermore, it has been found that the printed matter exhibits excellent water and lightfastness, and that the printed material also exhibits excellent resolution. The presence of satellites is greatly diminished and the size of any satellites is minimized. This is accomplished with a low concentration of pigment, and hence an ink having a low viscosity compared to the prior art pigmented ink jet inks.

In another embodiment, there is provided a process for preparing the ink jet ink of the present invention. The process involves creating a dispersion of the components of the ink and subjecting the dispersion to comminution. Preferably, the comminution is effected by use of a microfluidizer. The microfluidizer thereby creates a microemulsion, which generally comprises emulsified pigment in water due to the absorption of the water immiscible compound by the pigment. It is believed that through the absorption by the pigment of the water immiscible compound that many of the advantages of the present invention are realized. Subsequent to comminution, a separation step is practiced. Subsequent addition of water miscible compound and/or water to dilute the formulation to its final composition is then generally made.

In another embodiment of the present invention, there is provided a process of printing using the ink jet ink of the present invention. The printing is effected by using the ink jet ink in an ink jet printer, and applying the ink to a printing medium, which can, among other media, involve a coated ink jet paper, plain paper, transparencies, paper suitable for outdoor use, as well as other materials suitable for an outdoor use, such as polyvinyl chloride, polyester, polyethylene and such. The printer can be a desk printer or a wide format ink jet ink printer.

DETAILED DESCRIPTION OF THE PREFERRED EMBODIMENTS

A wide variety of organic and inorganic pigments, alone or in combination, may be selected to make the ink of the present invention. The term "pigment" as used herein means an insoluble colorant. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 10 micron. Preferably, the pigment particle size should range from 0.005 to 1 micron, more preferably, from 0.005 to 0.3 micron, and most preferably the size of the pigment particle should average less than 200 nm, and most preferably less than 150 nm.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation as in a process of preparing the inks from dry pigments. A premix of the pigment already dispersed in an aqueous medium can also be used as a starting material for preparing the ink of the present invention.

Representative commercial pigments that can be used in the form of a water wet presscake or premix include Super Seatone Blue G.S. (Hilton Davis of Cincinnati, Ohio); Super Seatone Magenta (Hilton Davis); Flexiverse Yellow (Sun Chemical Corp., Cincinnati, Ohio) Heucophthal® Blue BT-585-P, Toluidine Red Y (C.I. Pigment Red 3), Quindo® Magenta (Pigment Red 122), Magenta RV-6831 presscake (Miles Laboratories, Harmon Division, Haledon, N.J.), Sunfast® Magenta 122 (Sun Chemical Corp., Cincinnati, Ohio), Indo® Brilliant Scarlet (Pigment Red 123, C.I. No. 71145), Toluidine Red B (C.I. Pigment Red 3), Watchung® Red B (C.I. Pigment Red 48), Permanent Rubine F6B13-1731 (Pigment Red 184), Hansa® Yellow (Pigment Yellow 98), Dalamar® Yellow YT-839-P (Pigment Yellow 74, C.I. No. 11741), Sunbrite® Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc. Other typical pigments useful in the ink formulations of the present invention are Phthalocyanine Blue (C.I. 74260), Phthalocyanine Green (C.I. 74260), Hansa® Yellow 3G (C.I. 11670), Disazo Yellow GR (C.I. 21100), Permanent Red 4R (C.I. 12335), Brilliant Carmine 6B (C.I. 15850) and Quinacridone Red (C.I. 46500).

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

Among the most preferred pigments to be used in the ink formulations and process of the present invention are C.I. Pigment Red 122, C.I. Pigment Yellow 74 and C.I. Pigment Blue 15. The present invention is particularly advantageous in its use with colored pigments.

The amount of pigment contained in the ink jet ink formulation generally ranges from 2–10 wt %, based on the total ink formulation. More preferably, the amount of pigment ranges from about 3.5–7 wt %.

The inks of the present invention also comprise a water immiscible organic compound. By water immiscible, for purposes of the present invention, is meant an organic compound which dissolves in water to a concentration of no more than about 0.5% by weight. The water immiscible organic compound is a high boiling point compound. Generally, the organic compound exhibits a boiling point of at least about 200° C. and more preferably 280° C. or greater. The high boiling point should be high enough to prevent a high evaporation rate in the dispensing nozzle.

Suitable water immiscible organic compounds are commercially available and are generally known as plasticizers, with those most preferred being of the phthalate family. The most preferred organic compound is dibutyl phthalate. Either the ortho or meta isomer can be used. Additional commercially available compounds which can be used as the immiscible organic compound in accordance with the present invention, include diethylhexyl phthalate, butylbenzyl phthalate, butyloctanoate and diisooctylphthalate. Other suitable, but less preferred, materials are the Benzoflex materials, such as dipropylene glycol dibenzoate (Benzoflex 9-88); a 1:1 mixture of dipropylene glycol dibenzoate and diethylene glycol dibenzoate (Benzoflex 50); polyethylene glycol dibenzoate (Benzoflex 200); 2,3,4-trimethyl-1,3-pentanediol dibenzoate (Benzoflex 354) and propylene glycol dibenzoate (Benzoflex 400).

The high boiling water in immiscible organic compound is at least in part absorbed by the pigment. Absorption of the high boiling water immiscible organic compound by the pigment protects the pigment from water evaporation, and hence having the pigment dry out. During the comminution step, preferably accomplished by a microfluidizer or similar equipment, an microemulsion is formed comprised of the emulsified pigment in water. The emulsion is created due to the water immiscible organic compound being absorbed on the pigment. It is preferred that sufficient water immiscible organic compound is absorbed by the pigment to permit the formation of such a microemulsion. Absorption of the high boiling water immiscible organic compound by the pigment, therefore, leads to the stability of the ink jet ink and the avoidance of problems with plugging. The immiscible organic compound helps to prevent water loss from the pigment so that the pigment does not dry out, and therefore it does not form a crust. Generally, even if a crust does form, it will be very soft and can be easily cleaned.

In combination with the high boiling water immiscible organic compound is a water miscible compound. Among the water miscible compounds that are suitable, are compounds which generally boil about 160° C. or greater. It is important that the boiling point of the compound is at least high enough to avoid a high evaporation rate while sitting in the dispensing nozzle of an ink jet printer. The water miscible compound therefore helps to keep water evaporation to a minimum, thereby aiding in the anti-crusting of the ink jet inks. The water miscible compound can also help to deliver the water immiscible compound to the pigment for absorption if the water immiscible compound is somewhat miscible or soluble in the water miscible compound.

Suitable water miscible compounds include diacetone alcohol, 1,2-propanediol, 1,3-propanediol and hexadecanol, as well as diethylene glycol, polyethylene glycol (MW of 200 preferred), triethylene glycol, tetraethylene glycol, polyethylene glycol dilauryate, glycerin, 2-pyrrolidone, methyl pyrrolidone, diethylene glycol monoethyl ether, ethylene glycol monobutyl ether and neopentyl glycol. Alcohols and glycols are preferred, with diacetone alcohol, 1,2-propanediol, 1,3-propanediol, diethylene glycol and polyethylene glycol (200) being the most preferred water miscible compounds, particularly when used in combination with dibutyl phthalate.

When preparing the ink jet ink formulation, it is important in the early stages when the components are mixed that the amount of water miscible compound, particularly if it acts as a solvent for the water immiscible compound, is not so great as to prevent the water immiscible compound from being absorbed on the pigment. Generally, the weight ratio of water miscible to water immiscible compound should be less than 10 in the comminution stage, more preferably less than 3 and most preferably about 1, to ensure good absorption of the water immiscible compound by the pigment. Additional water miscible compound and water can be added subsequently to achieve the final ink jet ink formulation with its desired viscosity.

The final ink jet ink composition of the present invention generally comprises from about 3.5 to 10 wt % solids. Thus, the viscosity of the ink is generally lower than that of prior art inks. In general, for inks to be used in deskjet printers, the final formulation generally comprises from 2 to 10 wt % pigment, from 0.1 to 1.0 wt % water immiscible compound, from 0.1 to about 10.0 wt % water miscible compound, and the remainder water. More preferably, the formulation comprises from about 3.5 to 7 wt % pigment based upon the total formulation, from about 0.1 to 0.9 wt % water immiscible compound, and from 0.5 to 2.0 wt % water miscible compound, with the remainder being water.

For wide format printers, more water miscible compound is generally needed in the final ink formulation. Therefore, the final ink formulation to be used in the cartridge generally comprises from 2 to 10 wt % pigment, more preferably from 3.5 to 7 wt % pigment, from 0.1 to 1.0 wt % water immiscible compound, from 10–35 wt % water miscible compound, and the remainder water.

The ink jet ink composition of the present invention exhibits significant properties. For example, the ink is improved with regard to "decapping time". This is the time that the cartridge can be left in the open and still restarted without any plugging. The use of the combination of the water immiscible organic compound together with the water miscible compound provides a pigmented ink with excellent decapping time. The cartridge, after use, can be left for significant periods of time without plugging. Restarting of the printing process can occur at any time afterwards without a problem.

The inks of the present invention also exhibit excellent waterfastness, stability, drying times on the printed medium (particularly paper) and lightfastness. The combination of the high boiling point water immiscible organic compound agent with the water miscible compound allows one to formulate a pigmented ink jet ink with the properties desired for commercial use. The most striking behavior is that an image made by the pigmented inks of the present invention can be left under a tap water stream for more than an hour when printed on conventional media (especially on a plastic substrate), without any run off of cyan, magenta, yellow or any of the processed colors. The optical density of the initial and water exposed media is practically unchanged even after rubbing the image with a finger or piece of cloth.

The ink jet ink of the present invention can also include conventional additives, such as a surfactant, or an antibacterial agent. When a cyan pigment is being used, the ink preferably includes a salt, most preferably a potassium salt, of a styrenated acrylic resin. Excellent printing results are achieved with the ink containing the cyan pigment and the styrenated acrylic resin salt when the pH of the ink is in the range of from 8.8 to 11.5.

The composition can also comprise a fatty acid derivative such as a metal salt or an ester such as a polyethylene glycol dilauryate and the like. Of the fatty acid metal salts, stearate compounds are preferred. The stearate compound, which is generally not soluble in water, may be accompanied by a polymeric electrolyte to allow dispersion in the water. The stearate compound, or any fatty acid derivative, can be employed in a range from about 0.5 to 5 wt % based upon the total ink formulation, and more preferably from about 0.1 to 3 wt %. The fatty acid derivative presence aids in providing a printable ink with excellent stability and excellent image qualities. The compound can help improve both the stearic stabilization and electrokinetic stabilization of the ink pigments. The preferred stearate compound can be any of those commercially available, such as aluminum or zinc stearate. Generally, the stearate compound can be expressed in a formula as $M(OH)_n(C_{17}H_{35}COO)_m$, where M is the metal, e.g., aluminum or zinc, and n ranges from 0 to 3, with m ranging from 0 to 3.

The process for preparing the ink jet ink of the present invention involves grinding a dispersion of the pigment, water, water immiscible and water miscible compounds in order to comminute the particles, preferably until a bi-modal distribution of pigment particles is obtained. The creation of a microemulsion is generally achieved during this step. The term "bi-modal distribution" refers to a distribution of particles into at least two separate fractions of different average particle size. Generally, only two separate fractions or modes are observed. If more than two modes are observed, then the first mode will be considered the fraction of particles having the smaller average particle size and the second mode will encompass the remaining fractions.

The comminuting of the particles can take place in a single step, or in a two-step process. For example, the dispersion can first be milled in any generally appropriate and available mill, e.g., such as a ball mill, sand mill or media mill. Media mills which employ a horizontal media mill such as those manufactured by Netzsch, Eiger, Premier, and the like are efficient, and dispersions prepared using a horizontal media mill have been found to produce excellent colloidal dispersions which provide inks exhibiting excellent stability. A media mill can therefore be used to reduce the size of the particles to a certain level.

Excellent colloidal dispersions can also be prepared using other mills, e.g., an impingement mill or microfluidizer. In fact, it has been found that use of an impingement mill is most effective and efficient in reproducibly and consistently achieving a bi-modal distribution of particles within the dispersion. It is also most effective and efficient in creating a microemulsion of pigment (coated with the water immiscible compound) in water. An impingement mill operates by subjecting the dispersion to a pressure of as much as 35,000 psi in a hydraulic pump. The pump pushes the dispersion into a decompression chamber where the particles of the dispersion impinge on one another to comminute the particles. The comminution is effected both by the forces of impingement and cavitation. No foreign grinding medium is involved, which promotes the purity of the resulting dispersions. Descriptions of an impingement mill and their operation are also found, for example, in U.S. Pat. Nos. 4,533,254 and 4,783,502. Impingement mills are commercially available, e.g., Model M110T or M110Y, manufactured by Microfluidics, Inc., or the high-pressure homogenizer, filter extruder EmulsiFlex™ available from Avestin, Inc. of Ottawa, Canada.

Once the comminuting of the pigment particles is accomplished, a separation of the dispersed particles into two fractions is made. Preferably, a bi-modal distribution of the dispersed particles is achieved, in which case the separation is into the two separate modes of particles created by the comminuting. Generally, one of the modes will have an average particle size of about 300 nanometers or less, more preferably of about 200 nm or less, and most preferably of about 150 nm or less. It is this mode which is recovered and saved for use in the preparation of the ink formulations. The dispersion comprised of the second mode of particles having an average particle size greater than 300 nanometers can be used for other applications, or may be simply returned back to the manufacturing process for further grinding and separation.

The separation step can be achieved by any appropriate means available. It is preferred, however, that microfiltration or centrifugation be employed for reasons of practicality and efficiency. In particular, centrifugation is most preferred as it has been found to be quite efficient and effective in the separation of particles of 300 nanometers and less from the bulk of larger particles.

If desired, a second portion of the water miscible compound, water and/or water immiscible compound can be mixed together with the separated portion to bring the ink formulation to its final composition. For example, a first portion of water miscible compound can be added to the initial dispersion which is comminuted, followed by separation. A second portion of the water miscible compound plus additional water can then be added to the separated ink composition in order to form the final ink. This is preferred in order to enhance the stability of the ink and ensure good absorption of the water immiscible compound by the pigment.

In another preferred embodiment, the final ink formulation, prior to placing it in an ink jet ink cartridge, can be deaerated in a continuous or batch type deaerator. Such deaerators are available commercially from, for example, Freyma Corp. of Edison, N.J.; Koruma Corp. of Switzerland; or Jayco Corp. in the United States. Once the final product has been deaerated, it can also be filtered through a 1 micron filter to retain any dried particles or agglomerates of foreign materials. This filtration step generally lowers the viscosity from 1 to 2 cps. The ink can then be easily placed into the cartridge for use in a printer.

The ink jet ink of the present invention can be printed with any conventional ink jet printer, and can be printed on any ink jet medium, e.g., plain paper, coated ink jet paper or paper suitable for outdoor use, as well as vinyl media, overhead transparencies and synthetic media such as a white polyester. The stability of the ink formulation also allows long storage periods without any loss of printability. Storage with the printing orifice in contact with a polyethylene glycol/water mixture, e.g., the mixture saturating a pad, has also been found to prevent nozzle clogging. If the nozzle does happen to clog, use of such a mixture as a cleaner can easily unclog the nozzle.

The present invention will be further illustrated by the following examples, which are provided purely for illustration and are not meant to be unduly limiting. Where percentages are mentioned in the following examples, and throughout the specification, the parts and percentages are by weight unless otherwise specified.

EXAMPLES

Example 1

In this example, a cyan colored ink in accordance with the present invention was prepared.

An industrial premix was obtained from Hilton Davis Company of Cincinnati, Ohio. The premix had the composition of Table 1 below.

TABLE 1

| Ingredient | Weight Percent |
| --- | --- |
| Water | 60 |
| Copper phthalocyanine | 33.7 |
| Styrenated acrylic resin | 3.4 |
| Polypropylene glycol | 0.4 |
| Fatty acid derivative | 2.5 |

1000 grams of the premix were mixed with 1000 grams of water and the concentration of solids was approximately 20%. 40 to 60 grams of diisooctylphthalate were then added to the formulation together with 40 to 80 grams of diethylene glycol. The mixture was stirred in a Silverson unit (rotor-stator changeable clearance, high shear mixer) to wet the pigment by the additives and to disaggregate the weak agglomerates. The resulting mixture had the following composition of Table 2.

TABLE 2

| Ingredient | Weight Percent |
| --- | --- |
| Water - 1600 g | 74.1 |
| Copper phthalocyanine - 337 g | 15.6 |
| Styrenated acrylic resin - 34 g | 1.6 |
| Polypropylene glycol - 4 g | 0.2 |
| Fatty acid derivative - 25 g | 1.2 |
| Diisooctylphthalate - 40 g | 1.85 |
| Diethylene glycol - 80 g | 3.7 |
| Dispersing aid (CT136 of Air Products Corp.) - 40 g | 1.85 |

Figure 1:
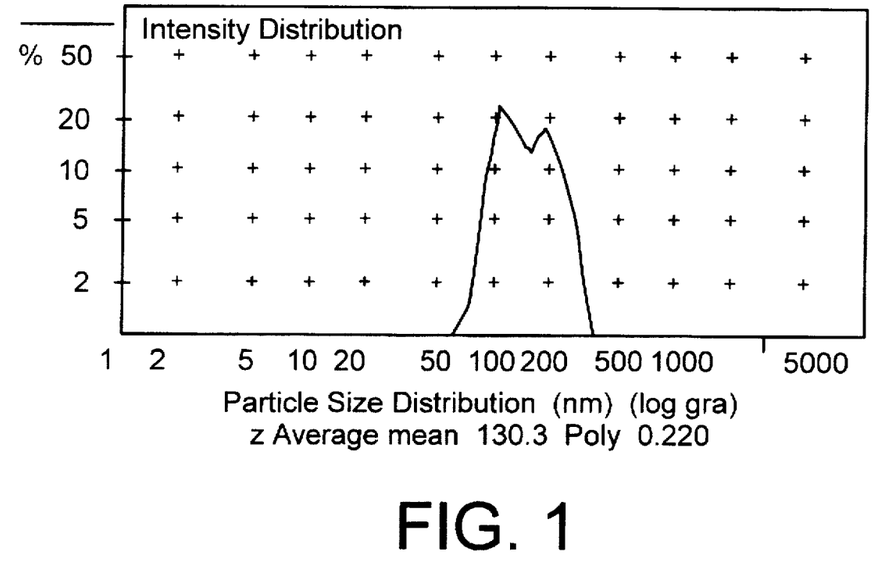
FIG. 1 of the drawing is a graphical representation of the size distribution of pigment particles in ink after centrifugation.
Figure 2:
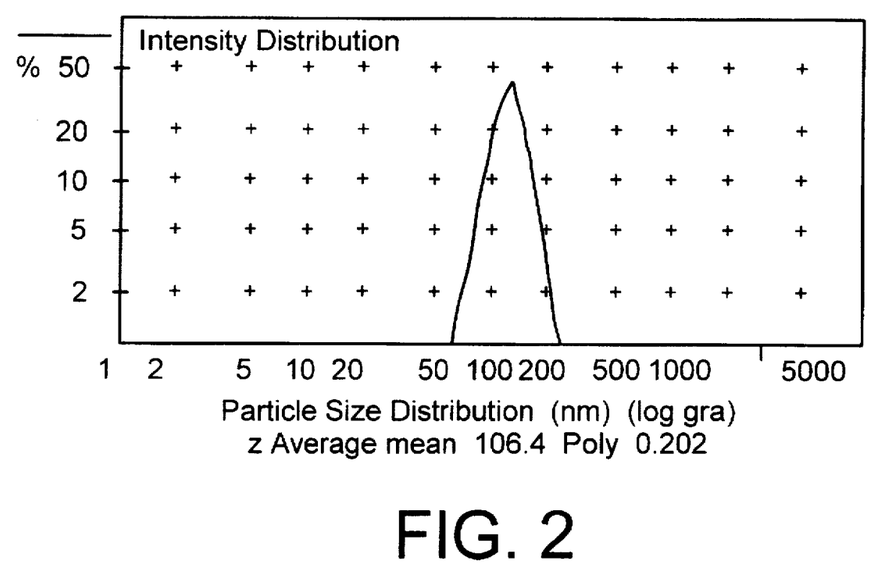
FIG. 2 is a graphical representation of the size distribution of the pigment particles in the fractions separated.

The composition of Table 2 was microfluidized in a Microfluidizer™ M-140 at pressures up to 35,000 psi for one to three passes. The resulting microemulsion was subjected to centrifugation. The mixture was centrifuged for up to 30 minutes, with the centrifugation above 15 minutes not resulting in any further apparent separation of solids. FIG. 1 demonstrates the particle size distribution of the mixture after the microfluidizer, whereas FIG. 2 demonstrates the particle size distribution of the fraction separated after the centrifugation.

The final adjustment of the materials to the ink formulation was then done in such a way that a final formulation consisted of the final composition in Table 3.

TABLE 3

| Ingredient | Weight Percent |
| --- | --- |
| Water | 63 |
| Diethylene glycol | 30 |
| Diisooctylphthalate | 0.8 |
| Dispersing agent (CT-136 from Air Products Corp.) | 0.8 |
| Biocide - Proxel GXL (from Zeneca Corp.) | 0.03 |
| Copper phthalocyanine | 4.5 |
| Fatty acid derivative | 0.35 |
| Styrenated acrylic resin | 0.50 |
| (Polypropylene glycol) | (trace amount) |

The final ink had the following physical characteristics:
ph-8.8
viscosity (cp)-4.0
surface tension-34.4 (dynes/cm)
minimum particle size in a distribution-66.3 nm
average particle size-137 nm
maximum particle size-310 nm The average particle size was determined using the photon correlation technique with the Autosign analyzer from Malvern. It should be noted that the use of other particle size analyzers, such as the Joyce Loeble type analyzer, can give different results, e.g., an average particle size as low as 40 nm (as opposed to the 137 nm size).

The resulting mixture was then put into a cartridge supplied by Laser Master Corp. and used in a Laser Master Display Marker (TM) to make prints. The prints were made on Hammermill uncoated paper, Rexam Graphics various coated vinyl grades, on Hewlett-Packard presentation grade product and Hewlett-Packard premier ink jet paper. In between each print, one hour of idle parking time was allowed, and then the decapping time was measured. The decapping time was identified as the time difference taken from the time the cartridge was parked in a slot of the printer and when a new print resumed. An internal priming cycle pattern was used to obtain the print. At least 98% of all of the nozzles fired after approximately 5 to 16 hours of idling time. That time was increased well over 16 hours when additional copper phthalocyanine and polyethylene glycol-200 was added to the formulation in Table 3.

Each of the prints outlined above were put into a sink, and hot tap water was run over the print. No runoff of the pigment was observed in any of the prints. Then a wet rub test was performed, consisting of rubbing the image with a finger while the tap water was still running. The images remained stable.

From the foregoing, it can be seen that the ink is wet rub resistant, waterfast, and does not clog the nozzles, even after prolonged idling time.

Example 2

The final cyan pigmented ink of Example 1 was placed into a Hewlett-Packard Deskjet Printer Model 540 and 450 pages of text were printed. The maximum idle time tested was 16 hours. There were no printing defects at any time during the printing.

This demonstrates that the ink of the present invention can print continuously for long periods of time without clogging the nozzle with the same intensity in the beginning of the print as in the end.

Example 3

A formulation useful for desktop inkjet printers such as the Hewlett-Packard Model 540 was prepared by adding an additional amount of diisooctylphthalate to the pigmented ink in Table 2 of Example 1 in such a way that after dilution and emulsification with water, the final formulation had the composition of Table 4.

TABLE 4

| Ingredient | Weight Percent |
| --- | --- |
| Water | 85.6 |
| Copper phthalocyanine | 6 |
| Diisooctylphthalate | 1.1 |
| Diethylene glycol | 5 |
| Styrenated acrylic resin | 1.3 |
| Dispersing agent | 0.8 |
| Biocide | 0.03 |

The resulting mixture was put into the cartridge of a Hewlett-Packard 540 printer. Several thousand pages were printed on the Hewlett-Packard 540 printer, with the cartridge being refilled every 400 pages, without the loss of any image quality.

Example 4

An ink of Example 1 and Example 3 was put into a simulator, which is capable of firing all 52 nozzles of a cartridge at once. Up to 10 refills of the cartridge were made. The cartridge was used in the Hewlett-Packard 540 model printer. The print quality of all 10 sheets was compared. No deterioration of the prints was observed, signifying no presence of any kogation (i.e., destructive action of the individual nozzle heaters).

This demonstrates that the inks of the present invention are basically neutral in behavior toward the individual heaters of different manufacturers and allow significant reuse of a cartridge.

Example 5

In this example, dibutylphthalate, dipropylene glycol dibenzoate, Benzoflex 50 (a 50-50 mixture of diethylene glycol dibenzoate and polyethylene glycol dibenzoate), Benzoflex 354 (2,2,4-trimethyl-1,3-pentanedioldibenzoate) and Benzoflex 400 (propylene glycol dibenzoate) were compared with the use of diisooctylphthalate in the preparation of inks using the ink composition of Example 3. The results of the various inks obtained in terms of visual color of prints made are shown in Table 5 below.

TABLE 5

| Ink Formula - Water Immiscible Compound | Visual Color of Print |
| --- | --- |
| Dibutylphthalate | dark blue |
| Dipropylene glycol dibenzoate | dark blue |
| Diisooctylphthalate | true cyan |

TABLE 5-continued

| Ink Formula - Water Immiscible Compound | Visual Color of Print |
|---|---|
| Benzoflex 50 | dark cyan |
| Benzoflex 354 | dark cyan |
| Benzoflex 400 | almost black |

As can be seen from the foregoing table, good results are achieved with all of the water immiscible compounds. However, the best results for purposes of the cyan ink are shown to occur with the use of a phthalate. Of course, the use of other water immiscible compounds can allow changes in the shade of cyan, if so desired, when preparing the inks of the present invention.

Example 6

Pigmented magenta ink was prepared in a manner similar to the preparation of the cyan ink in Example 1. An initial premix of Hilton Davis with regard to Superseaton Red 122 was used and had the following composition:

TABLE 6

| Ingredient | Weight Percent |
|---|---|
| Quinacridone Red 122 pigment | 37.2 |
| Polypropylene glycol | 2.1 |
| Styrenated acrylic resin | 3.4 |
| Water | 54.3 |
| Diethylene glycol | 3 |
| Triethanol amine | trace |

The final ink was obtained according to the procedure of Example 1 involving microfluidization and centrifugation. The composition of the final ink is given in the following Table 7.

TABLE 7

| Ingredient | Weight Percent |
|---|---|
| Quinacridone Red 122 pigment | 6 |
| Dibutylphthalate | 0.8 |
| CT-136 (dispersant) | 0.1 |
| Proxel GXL | 0.03 |
| Styrenated acrylic resin | 1 |
| Water | 62 |

Physical characteristics of the ink were as follows:

pH-7.9 viscosity-7.4 cp surface tension-36.5 dynes/cm average particle size-280–340 nm

The ink was used to make prints on coated vinyl substrates, coated on bond papers and showed a complete waterfastness and excellent resistance to the wet rub test. Both tests were those described in Example 1.

The ink was remarkably good in printing and demonstrated true magenta color space.

Example 7

The magenta ink of the composition in Table 8 below was prepared using the premixing step in a Silverson disperser, microfluidized until bimodal distribution was obtained, and separated in a Carr P-6 Powerfuge centrifuge at the rate of 150 mils/min. and at 22,000 g force.

TABLE 8

| Ingredient | Weight Percent |
|---|---|
| Quinacridone Red 122 pigment | 7 |
| Dibutylphthalate | 0.66 |
| CD-136 | 0.44 |
| Proxel GXL | 0.1 |
| Diacetone alcohol | 0.66 |
| Water | 90 |
| Styrenated acrylic resin | 1 |

The physical properties of the ink were as follows:

viscosity-1.6 to 1.9 cp surface tension-35 dynes/cm average particle size-190 to 300 nm The ink was used successfully in making prints using a Hewlett-Packard 540 model printer.

Example 8

Yellow ink was made in accordance with the procedure of Example 1. The starting dispersion was obtained from Sun Chemicals Corp. of Cincinnati, Ohio and had the composition of Table 9.

TABLE 9

| Ingredient | Weight Percent |
|---|---|
| Yellow 74 pigment | 37 |
| Water | 51.3 |
| Styrenated polyacrylic acid | 8.5 |
| Styrenated acrylic resin | 3.2 |

This mixture was diluted to 20% solids with the addition of distilled water, diacetone alcohol and dibutylphthalate. The final ink had 7% total solids, 0.9% by weight of diacetone alcohol and 0.5% by weight of dibutylphthalate. About 2% by weight of the solids constituted styrenated polyacrylic acid and styrenated acrylic resin.

The ink was used to print more than 2000 pages on a Deskjet 540 printer, without any deterioration of the image seen throughout the 2000 pages. The viscosity of the ink used was about 1.6 to 1.9 cps. Surface tension was about 36 dynes/cm. The pH of the ink was about 8.2 to 8.5 and the average particle size was about 120 nm.

Example 9

A yellow ink composition was made in accordance with the procedure of Example 1. The final ink had the following composition:

TABLE 10

| Ingredient | Weight Percent |
|---|---|
| Water | 61 |
| Yellow 74 pigment | 5 |
| Styrenated resins | 2 |
| Dibutylphthalate | 0.6 |
| Diacetone Alcohol | 0.9 |
| Diethylene glycol | 30 |
| Proxel GXL | 0.03 |
| CT-136 | 0.1 |

The ink exhibited a pH of 8.2, a viscosity of 3 cps and a surface tension of 37 dynes/cm.

The ink was successfully used in a wide format printer and was waterfast and exhibited good wet rub resistance when printed on a variety of medias as in Example 1.

Example 10

Five yellow ink compositions were made in accordance with the procedure of Example 8. The five ink compositions are shown in Table 11.

TABLE 11

| Ingredient | Ink Composition | | | | | |
|---|---|---|---|---|---|---|
|  | A | B | C | D | E | F |
| Yellow 74 pigment | 5 | 5 | 5 | 5 | 5 | 5 |
| Dibutylphthalate | 0.5 | 0.5 | 0 | 0.5 | 0.5 | 0.5 |
| Diacetone alcohol | 0.9 | 0 | 0.9 | 0.9 | 0.9 | 0.9 |
| Diethylene glycol | 0 | 0.5 | 0.5 | 0.5 | 0.5 | 25 |
| CT-136 Dispersing Aid | 0.1 | 0.1 | 0.1 | 0 | 0.1 | 0.1 |
| Water | 91.5 | 91.9 | 91.5 | 91.1 | 91 | 67.5 |
| Styrenated Resins | 2 | 2 | 2 | 2 | 2 | 2 |

Each of the inks were used to print from a DeskJet 540 printer on Hewlett-Packard premium paper. Each of the prints were then tested for waterfastness as in Example 1 and lightfastness. The lightfastness was measured in terms of Delta E. The Delta E is conventionally measured by means of a spectrophotometer. The exposure to effect accelerated fading is exposure to a 100 Kilolux intensity Xenon lamp with long and short UV capability. The difference in color is measured by the spectrophotometer. Such devices to expose the print and measure the Delta E are commercially available, with an Atlas fadometer being used in the present case.

The best results were obtained from ink composition A. This ink composition exhibited excellent waterfastness and lightfastness. Ink composition C, which contained no dibutylphthalate, did not exhibit waterfastness, and also faded excessively. Ink compositions B, D and E did exhibit waterfastness, as they all contained dibutylphthalate, but their lightfastness was not as good as that of ink composition A.

It is believed that if the presence of the water miscible compound, here diethylene glycol together with the diacetone alcohol, is in amounts so great such that competition for the pigment exists between the water miscible and the water immiscible compounds, then sufficient absorption by the pigment of the dibutylphthalate may not be achieved, resulting in some inferiority with regard to lightfastness. In ink composition F, all the diethylene glycol was added in the beginning when the mixing of the ingredients occurred. The final ink composition exhibited excessive fading and no light fastness.

Example 11

Using the inks of Examples 1, 7 and 9, cyan, magenta and yellow pigmented inks in accordance with the present invention were used in an HP540 printer with a three color compartment cartridge to print images on an Epson transparency. In comparison, magenta and process black images were obtained on the Epson transparency using a HP540 printer where the inks used were OEM supplied dye based inks.

Figure 3:
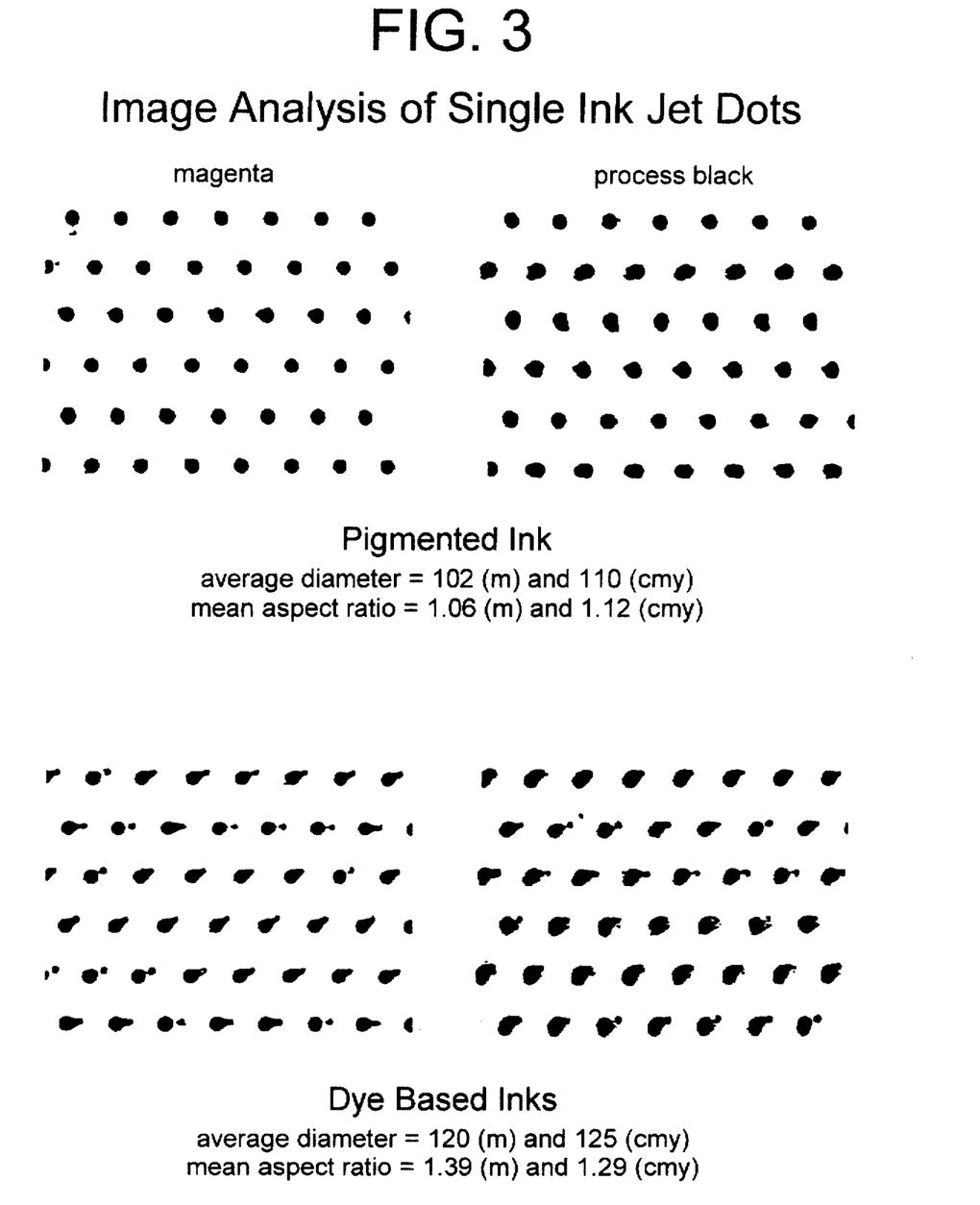
FIG. 3 is an image analysis of single ink jet dots.

The magenta and processed black dots of the present invention were almost perfectly round, smaller in size and better registered in comparison with the dye based inks. There was also much lower satellite frequency. See, FIG. 3.

Figure 4:
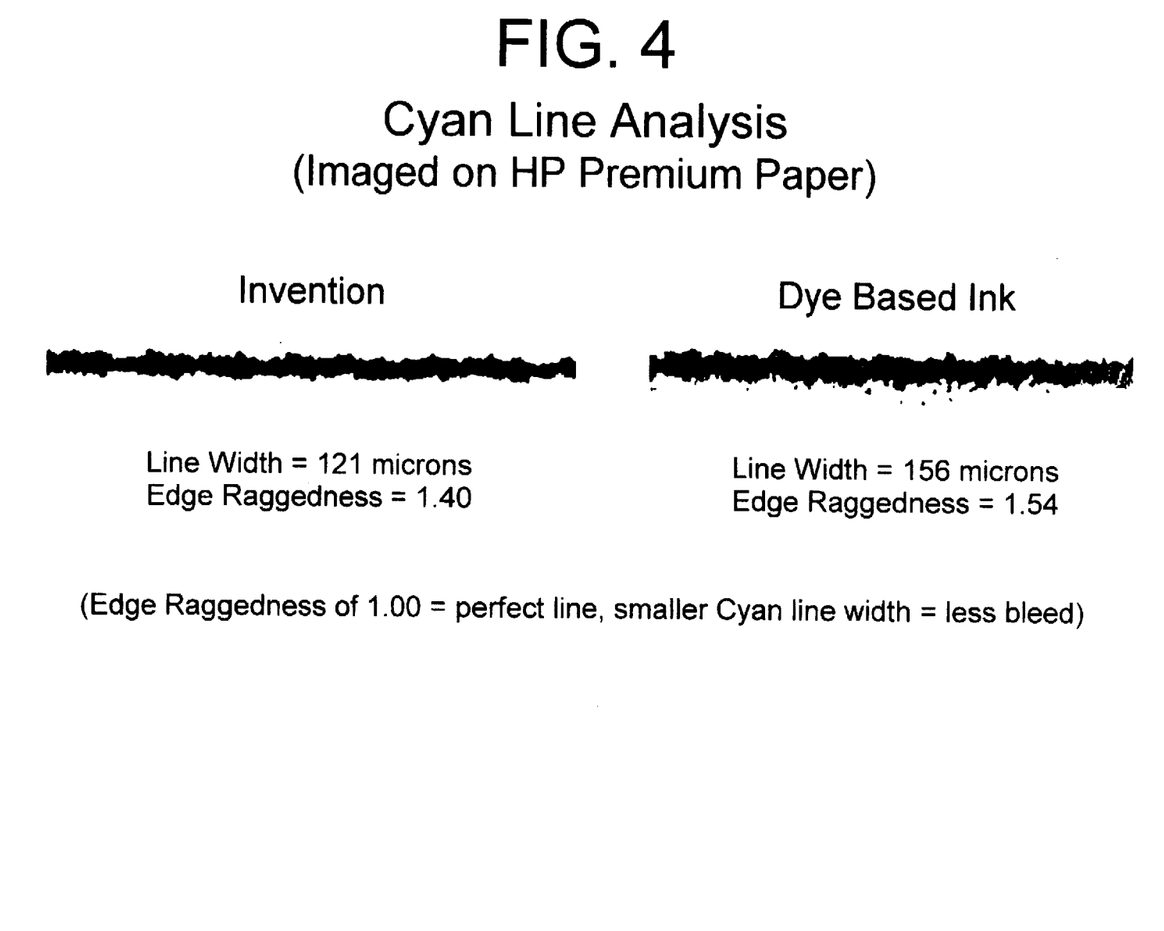
FIG. 4 is a comparative line analysis for printed lines.

When a cyan pigmented ink of the present invention was printed to make an image of a single line and compared with the dye based image of the same line, the ink of the present invention had a better resolution, as measured in average width of the line. More specifically, the average width of the line using the cyan ink of the present invention was about 121 microns versus 156 microns for the OEM supplied dye based ink. The line edge raggedness, which is a measure of the line length deviation from a perfectly straight line, was measured as 1.4 for the cyan ink of the present invention versus 1.54 for the OEM supplied dye based ink. See, FIG. 4.

Example 12 (Comparative)

The present comparative example shows clogging when a water immiscible compound is not used in the composition.

No immiscible compound was used in the procedure of Examples 1, 7 and 9. The inks obtained clogged the nozzles in a short time (less than 30 minutes of idle time) and could not be used in either desk jet or wide format printers. An ultrasonic cleaner was needed to restart the cartridge at each printing action resumption.

Example 13 (Comparative)

Figure 5:
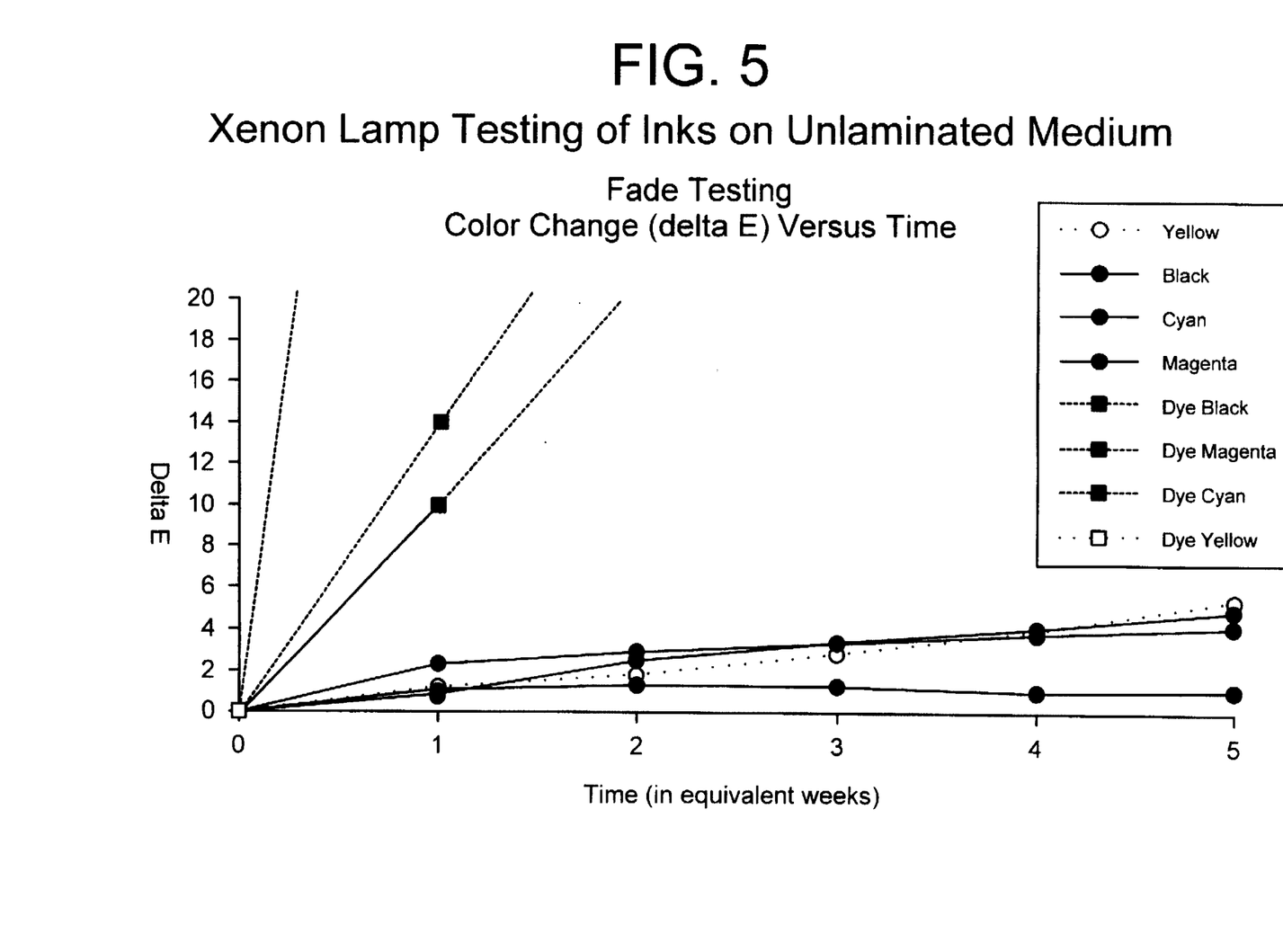
FIG. 5 is a graphical representation of the fading of an ink print over time.
Figure 6A:
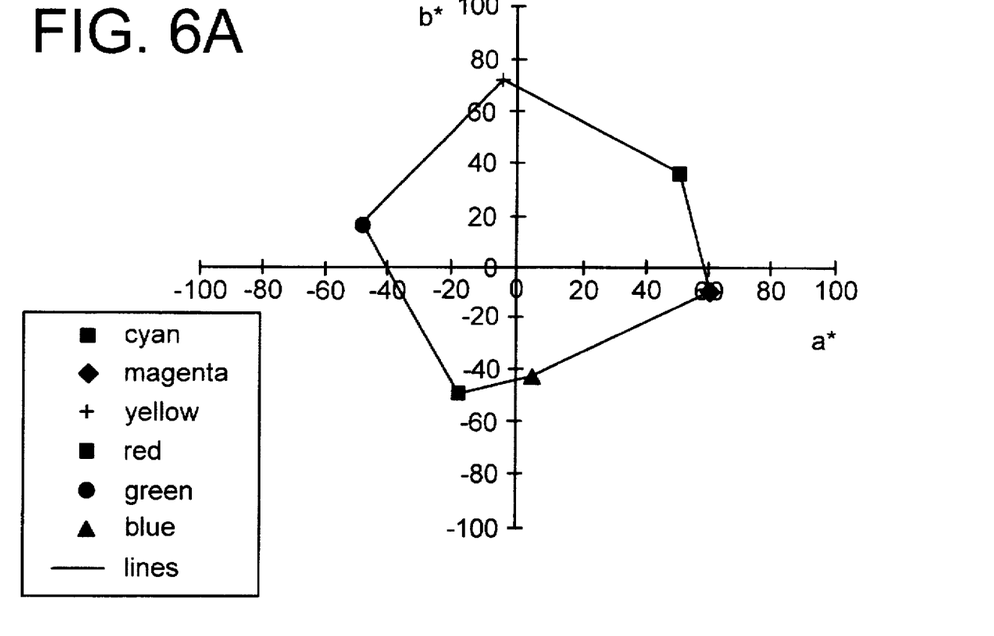
FIG. 6 is a color gamut representation for Example 15, with the images printed on a photobase medium.
Figure 6B:
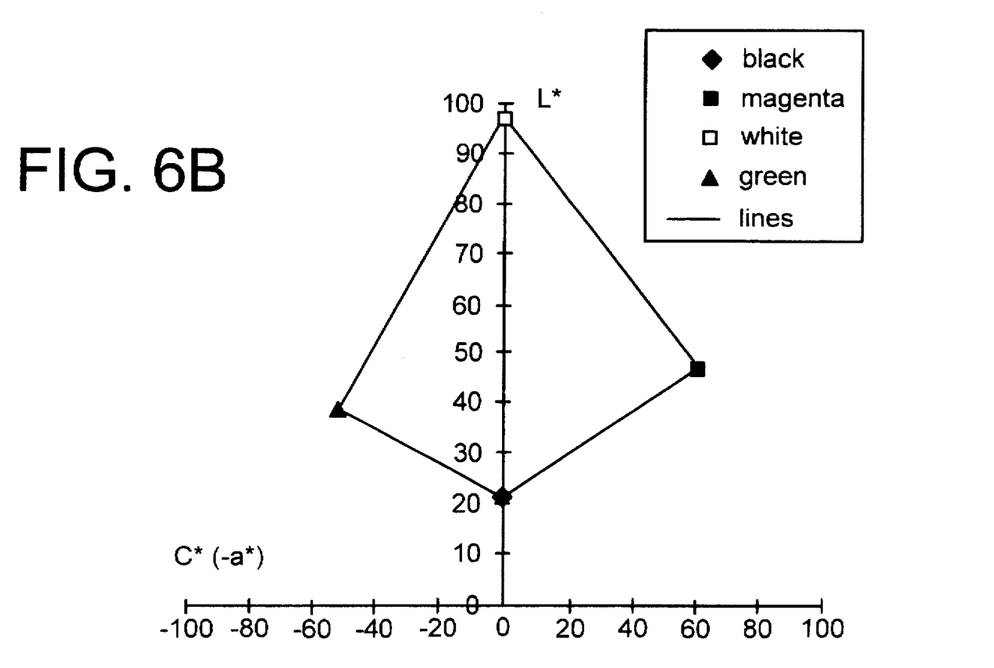
Figure 6C:
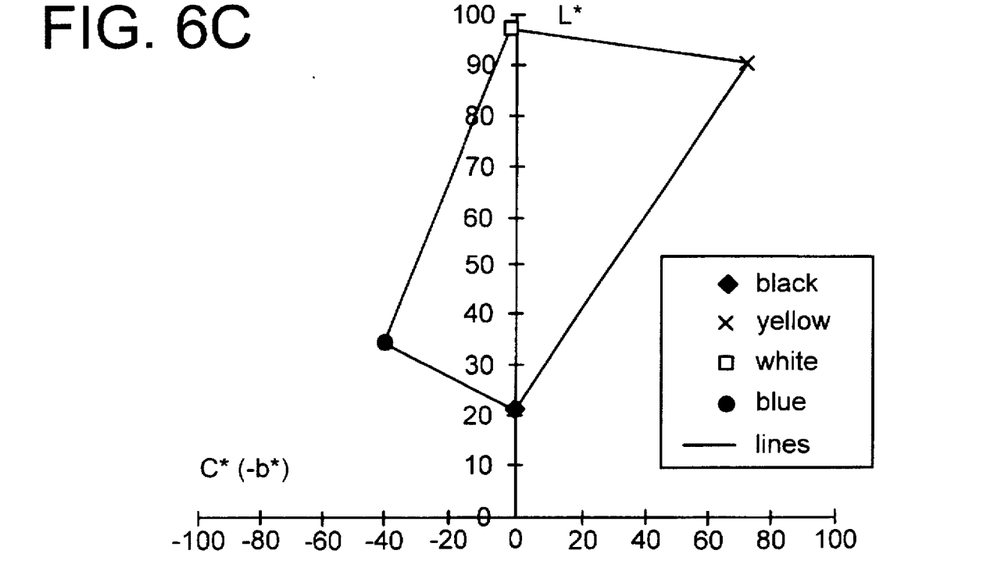
Figure 6D:
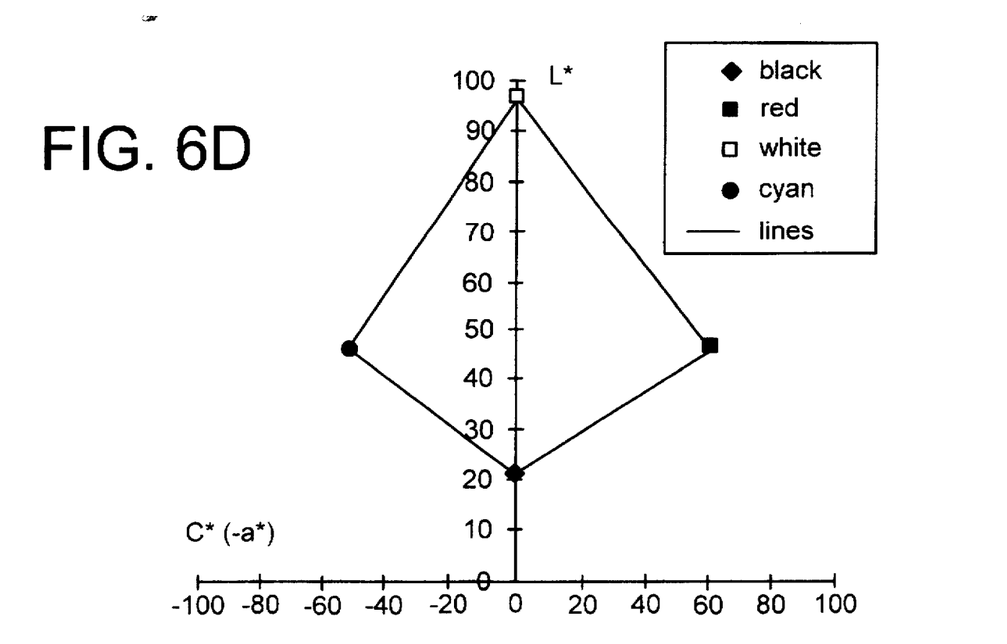
Figure 7A:
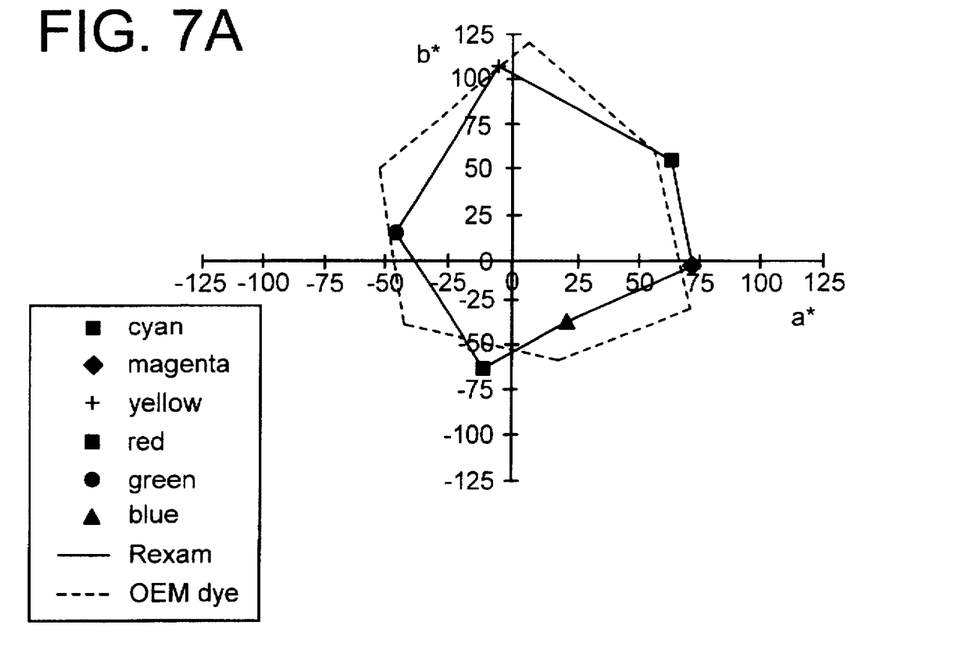
FIG. 7 is a color gamut representation for Example 15, with the images printed on a Hewlett-Packard premium paper.
Figure 7B:
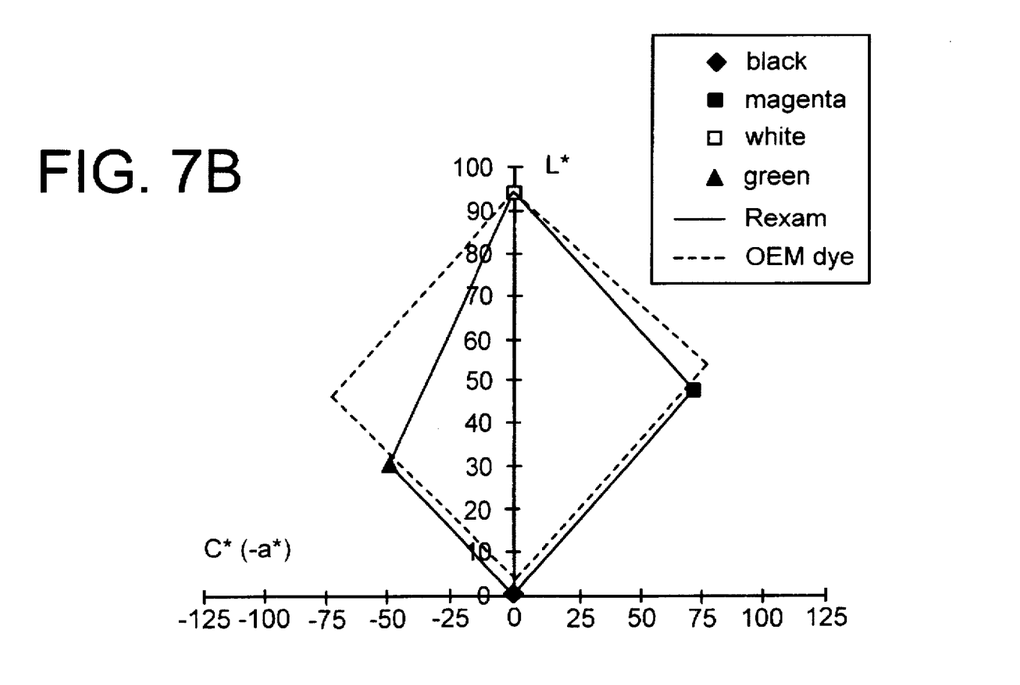
Figure 7C:
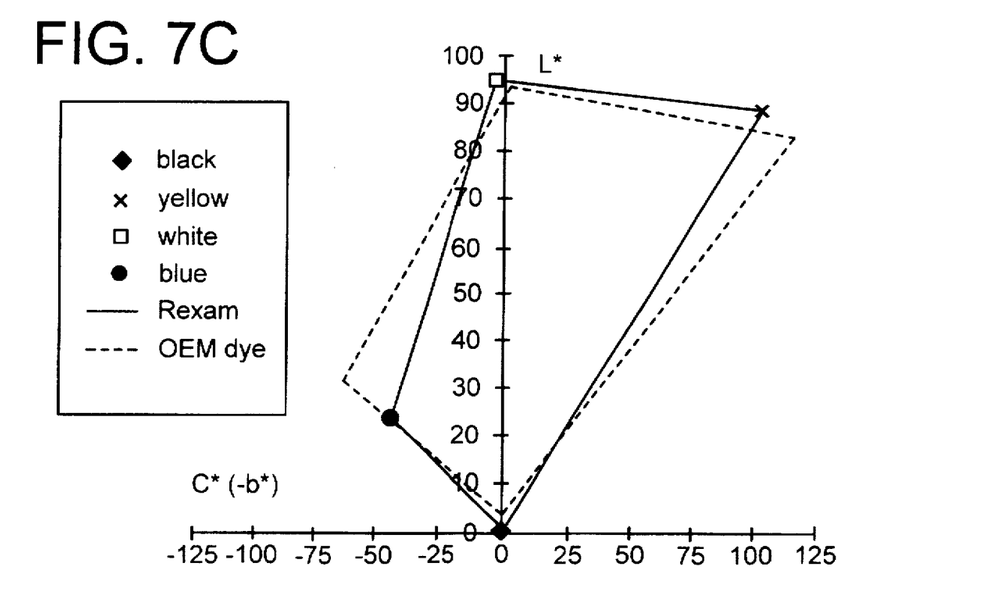
Figure 7D:
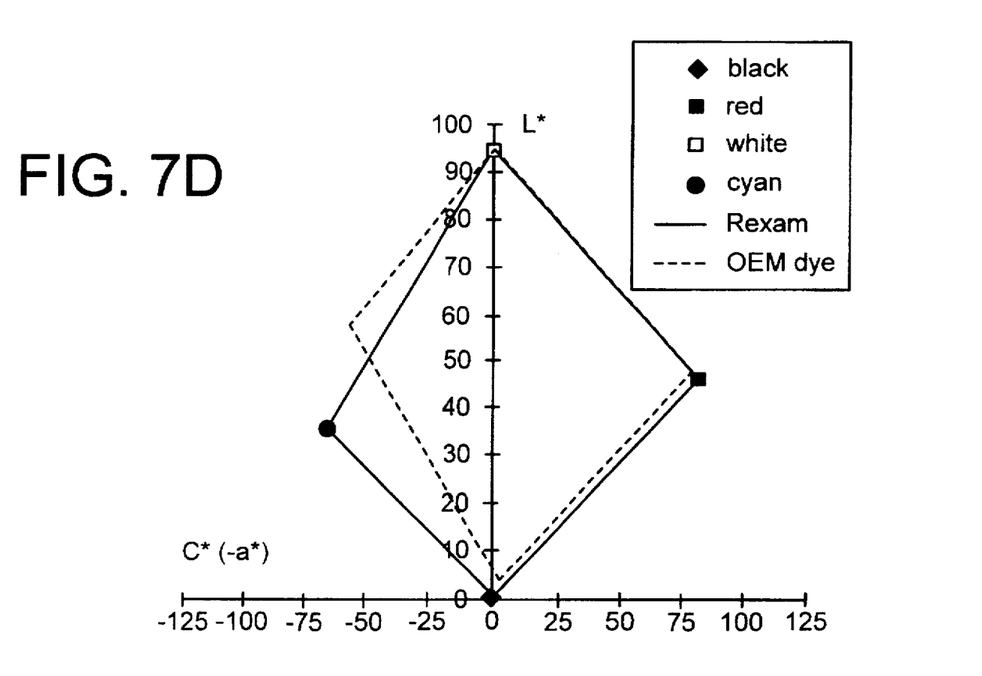

OEM supplied dye based inks were compared for water and lightfastness with pigmented inks of the present invention. FIG. 5 shows a comparison of fading rate, measured as described in Example 10. One can see that the pigmented inks of the present invention are incomparably more stable as the color change (Delta E) is much less. The Delta E for the inks of the present invention can be less than 5 Delta E after 600 hours.

Example 14

The lightfastness of the pigmented inks of the present invention were compared to the lightfastness of hot melt pigmented inks which are commercially available. Prints were made on a NovaJet II printer using Rexam Graphics ink jet vinyl grade 6309 media. Some of the prints were then laminated with a protective, clear vinyl or polyester film coating. All of the prints were then exposed to a Xenon lamp for 600 hours with the Delta E being measured after exposure as described in Example 10. This test in essence observes the outdoor presentation of the prints as made by electrostatic imagery and screen printing. The results of the test are given below in Table 11.

TABLE 12

| Ink | Delta E Unlaminated Print | Delta E Laminated Print |
|---|---|---|
| Pigmented Ink of the Present Invention |  |  |
| Magenta | 5.4 | 2.5 |
| Cyan | 5.6 | 2.5 |
| Yellow | <20 | 7.4 |
| Black | >2.0 | <1 |
| Commercial Solid Ink-Jet Inks (Pigmented) |  |  |
| Magenta (400 hrs.) | 34 | n/a |
| Cyan (400 hrs.) | 7.0 | n/a |
| Yellow (400 hrs.) | 12.0 | n/a |
| Electrostatic Toners |  |  |
| Cyan | 10 |  |
| Magenta | 10.68 |  |
| Yellow | 1.67 |  |

It is clear that cyan and magenta inks of the present invention are much more lightfast than wax protected commercial pigmented inks used in hot melt printers. When cyan, magenta, yellow, red, green and blacks inks of the present invention are printed on wide format printers and laminated, even after 30 days of outdoor direct exposure to the sun, the Delta E for all of them is in the range of about 1 to 4 Delta E units. This indicates that they are very stable with the laminate. It is also clear from the foregoing table that the use of a yellow toner particle as a pigment would be advantageous in the present invention. Therefore, in a preferred embodiment, the yellow pigment used is a particle comprised of a nickel compound and an azo dye. Such yellow pigments are available commercially.

Example 15

This example relates to a color gamut comparison between inks of the present invention and commercial dye based inks. The method used for creating the color gamut is as follows:

A method for calculating a single number measure of color gamut for a digital printer system is described. An approximation of color gamut is determined by a straightforward calculation of three-dimensional volume, applied in CIE L*a*b* space. This calculation applies to any printer system using cyan, magenta, yellow primaries, but is specifically designed for binary printers. The L*a*b* values of eight colors—cyan, magenta, yellow, red, green, blue, black and white—are measured with a spectrophotometer; the eight coordinates of the color are used to generate a polygon.

The volume is determined by dividing the polyglon into six tetrahedrons. The volume of each tetrahedron is defined by the determinant of a four by four matrix.

$$\text{Volume (r, y, k, w)} = 1/6 * \begin{vmatrix} L^*_r & a^*_r & b^*_r & 1 \\ L^*_y & a^*_y & b^*_y & 1 \\ L^*_k & a^*_k & b^*_k & 1 \\ L^*_w & a^*_w & b^*_w & 1 \end{vmatrix}$$

L*a*b* gamut number =
 Volume (r, y, k, w) + Volume (y, g, k, w) +
 Volume (g, c, k, w) + Volume (c, b, k, w) +
 Volume (b, m, k, w) + Volume (m, r, k, w)

The L*a*b* gamut number is useful in describing the color capability of a digital printer screen. This measure is suitable for characterizing the color gamut of liquid ink yet, wax thermal transfer, phase change ink jet, electrophotographic, and electrographic systems, as well as the effect on color gamut of various liquid ink jet media and inks.

The color gamut of a digital printer system can be visualized by a three-dimensional plot, which can be rotated for viewing at all angles. More simply, four two-dimensional projections of the L*a*b* gamut can be used to accurately represent the color gamut.

Projection of the six colors (CMYRGB) onto the a*-b* plane is most common representation. Three different projections onto L*-C* plane can be used to define the rest of the space. The three pairs of color opposites (cyan-red, magenta-green, and yellow-blue) are plotted in combination with black and white. Because these color combinations are across from each other in the a*-b* plane (hue difference of around 180 degrees), the plots are made by arbitrarily assigning one of the two chromas to be negative.

These representations provide good representations of the color gamut for various technologies ink sets and media types, especially where the color gamuts are significantly different. The calculation and visualization of color gamut is important in characterizing printer color capability.

Cyan, magenta, yellow, red, green, blue and black inks of the present invention were printed. (The red, green and blue are the process colors derived from cyan, magenta and yellow primary inks of the Examples 1, 7 and 9). The color gamuts are shown in FIGS. 6 and 7. A gamut comparison of the inks of the present invention derived from Examples 1, 7 and 9, and a black ink in accordance with the present invention, are presented in comparison with the dye based inks in the Figures. The L*, a* and b* for each of the colors are presented in the Tables below:

TABLE 13

(FIG. 6)

|  | L* | a* | b* | c* | ho (degrees) |
|---|---|---|---|---|---|
| Black | 21.70 | 0.28 | −2.39 | 2.41 | 276.7 |
| White | 96.97 | 0.40 | −3.56 | 3.58 | 276.4 |
| Cyan | 46.21 | −17.67 | −48.52 | 51.64 | 250.0 |
| Magenta | 47.19 | 59.61 | −8.81 | 60.26 | 351.6 |
| Yellow | 91.05 | −4.42 | 71.98 | 72.12 | 93.5 |
| Red | 46.27 | 49.29 | 35.54 | 60.77 | 35.8 |
| Green | 39.14 | −48.03 | 16.35 | 50.74 | 161.2 |
| Blue | 34.30 | 4.41 | −42.02 | 42.25 | 276.0 |

TABLE 14

(FIG. 7)

|  | L* | a* | b* | c* | ho | L* | a* | b* | c* | ho (degrees) |
|---|---|---|---|---|---|---|---|---|---|---|
| Black | 0.70 | 1.16 | 0.39 | 1.22 | 18.6 | 4.31 | 2.28 | −0.42 | 2.32 | 349.6 |
| White | 94.39 | 0.02 | −2.18 | 2.18 | 270.5 | 93.41 | −0.1 | 3.48 | 3.48 | 91.6 |
| Cyan | 34.94 | −11.11 | −63.65 | 64.61 | 260.1 | 57.13 | −43.66 | −36.31 | 56.79 | 219.7 |
| Magenta | 47.93 | 70.99 | −5.29 | 71.19 | 355.7 | 53.44 | 71.21 | −29.19 | 76.96 | 337.7 |
| Yellow | 89.17 | −5.53 | 107.38 | 107.52 | 92.9 | 83.58 | 6.97 | 121.8 | 122.00 | 86.7 |
| Red | 46.85 | 62.57 | 53.30 | 82.19 | 40.4 | 47.98 | 56.15 | 56.38 | 79.57 | 45.1 |
| Green | 31.33 | −47.50 | 14.92 | 49.79 | 162.6 | 47.01 | −54.17 | 50.62 | 74.14 | 136.9 |
| Blue | 23.78 | 21.11 | −36.76 | 42.39 | 299.9 | 31.81 | 17.49 | −58.7 | 61.25 | 286.6 |
| Gamut number | 371462 | | | | | Gamut number | 443533 | | | |

It is quite remarkable that the color space for the pigmented inks is almost equal to the best commercial dye inks on the glossy surface. The images were printed on a photobase medium and on a Hewlett Packard premium paper. The total "volume metric" gamut number on the photo based printing media is 371K for the pigmented inks of the present invention and 443K for the best available commercial dye based inks. Keeping in mind that the dye based inks cover the printing space with coloring elements having molecular (angstrom range) dimensions, and that the pigmented inks represent particles thousands of angstrom in dimension, attaining such a large color space is truly unexpected for the pigmented ink.

The color gamut demonstrates that the inks of the present invention are approaching dye based inks with respect to initial color veracity and brightness, while improving on its waterfastness, lightfastness and wet rub resistance. This is true respective of the medium employed in the printing.

Example 16

The magenta ink of Example 7 the cyan ink of Example 1 and the yellow ink of Example 9 were put into a cartridge and printed on a printer simulator. The simulator was capable of firing each individual nozzle on demand. The meniscus rise time and flooding characteristics for the inks were measured. The meniscus rise time was measured electronically and represents the time between the ejection of the drop from the nozzle and the rise of the liquid in the nozzle channel and preparation for the next ejection. The volume of liquid was measured by dividing the amount of collected liquid by the number of pulses. The frequency of drop ejection was maintained at 5000 Hertz. The flooding was observed on a CRT by using a high speed video camera. The field division was concentrated on two nozzles adjacent to a firing nozzle from both sides of that nozzle.

The meniscus rise time was measured for the inks of Examples 1, 3, 4, 7 and 9 and was found to be from a 156 to 171 microseconds. This is either faster or equal to the rise time of commercially available dye based system.

The flooding level was recorded to be from 1 to 2 relative units. We attribute the low-level of flooding attained to the favorable rheological characteristics of the inks of the present invention, i.e., viscosity and surface tension. The drop size was about 140 picaliters.

Example 17

This example demonstrates storage stability.

Pigmented inks of Examples 1, 7 and 9 are made and stored without stirring. The particle size was monitored during a three month storage.

| Ink | Particles Size (Average) | Days |
| --- | --- | --- |
| Cyan of Example 1 | 131 | 0 |
|  | 134 | 17 |
|  | 137 | 31 |
|  | 125 | 62 |
| Magenta Ink of | 258 | 0 |
| Example 7 | 304 | 7 |
|  | 307 | 22 |
|  | 307 | 40 |
| Yellow Ink of | 148 | 0 |
| Example 10 | 161 | 17 |
|  | 164 | 31 |
|  | 148 | 62 |

Statistically, within 99.5% probability, the inks are stable and generally do not settle or aggregate based upon the foregoing results.

Example 18

Six hundred grams of water, 350 grams of red 122 dry pigment, 50 grams of dibutyl phthalate and 90 grams of diacetone alcohol were mixed in a Silverson mixer and ground in an Eiger Mill using a speed of 100 mils per minute with ceramic media of 0.6 to 0.8 millimeter in size until the average particle size of the dry pigment was reduced to below 1.2 microns. The resulting materials were microfluidized until a bi-modal distribution was obtained. The mixture was centrifuged with a fraction collected having average particle size of about 200 nanometers. This fraction was diluted with distilled water further to about 6% solids mixture, to which mixture was added 5% by weight of dibutylphthalate with stirring.

The ink was imprinted using a HP 540 printer on Hammermill bond paper. The print showed good print characteristics and good waterfastness.

Example 19

A pigmented magenta ink was prepared in accordance with the procedure of Example 6. The ink formulation, however replaced the diethylene glycol with 1,3-propanediol in the same weight percent. The final ink formulation was placed into a printing cartridge uncapped, and then the cartridge was placed into a Laser Master Display Marker™ to make prints. In the printing mode, 100% firing of the cartridge nozzles were observed to fire. This indicated that no plugging occurred.

When the ink formulation of Example 6 was also placed into the Laser Master Display Marker™ to make prints, at least 92% of all of the nozzles were observed to fire. This indicates that 1,3-propanediol would be a preferred water miscible compound as compared to diethylene glycol.

Example 20

A cyan colored ink in accordance with the procedure of Example 1 was prepared except that the amount of CT-136 in the final formulation was adjusted to 1.0 wt %, and the diisooctylphthalate was replaced by dibutylphthalate in a wt % 1.0. The average particle size of the final ink formulation was about 104 nm. The resulting ink formulation was put into a cartridge and used in a Laser Master Display Marker™ to make prints. The prints were made on Hammermill uncoated paper and excellent printing results were observed. The prints were also tested for waterfastness in accordance with the test of Example 1, with the images remaining extremely stable.

While the invention has been described with preferred embodiments, it is to be understood that variations and modifications may be resorted to as will be apparent to those skilled in the art. Such variations and modifications are to be considered within the purview and the scope of the claims appended hereto.

What is claimed:

1. An ink jet ink formulation comprised of pigment, water, a water immiscible organic compound exhibiting a high boiling point, and a water miscible compound, with at least a portion of the water immiscible organic compound being absorbed by the pigment.

2. The ink jet ink formulation of claim 1, wherein the amount of organic compound and water miscible compound is sufficient to effect anti-crusting of the ink formulation.

3. The ink jet ink formulation of claim 1, wherein the pigment is a colored pigment.

4. The ink jet ink formulation of claim 1, wherein the organic compound exhibits a boiling point of at least about 280° C.

5. The ink jet ink formulation of claim 1, wherein the water immiscible organic compound is selected from the group consisting of dibutyl phthalate, diethylhexyl phthalate, butyloctanoate, butylbenzyl phthalate and diisooctylphthalate.

6. The ink jet ink formulation of claim 1, wherein the water immiscible organic compound is comprised of dibutyl phthalate.

7. The ink jet ink formulation of claim 1, wherein the water immiscible organic compound is comprised of diisooctylphathalate.

8. The ink jet ink formulation of claim 1, wherein the water miscible compound exhibits a boiling point of at least 160° C.

9. The ink jet ink formulation of claim 1, wherein the water miscible compound is selected from the group consisting of diacetone alcohol, 1-3-propanediol hexadecanol, 1,2-propanediol, diethylene glycol, polyethylene glycol and mixtures thereof.

10. The ink jet ink formulation of claim 9, wherein the water miscible compound is comprised of diacetone alcohol, 1,3-propanediol or diethylene glycol.

11. The ink jet ink formulation of claim 1, wherein the amount of pigment in the formulation ranges from about 2 to 10 wt %, the amount of water immiscible organic compound ranges from about 0.1 to 1 wt %, the amount of water miscible compound ranges from about 0.1 to 10 wt %, with the remainder of the formulation comprising water.

12. The ink jet ink formulation of claim 1, wherein the amount of pigment in the formulation ranges from about 3.5 to about 7 wt % based upon the weight of the entire formulation, the amount of water immiscible organic compound ranges from about 0.1 to 0.9 wt %, the amount of water miscible compound ranges from about 0.5 to 1.0 wt %, with the remainder of the formulation comprising water.

13. The ink jet ink formulation of claim 1, wherein the amount of pigment in the formulation ranges from about 2 to 10 wt %, the amount of water immiscible compound ranges from about 0.1 to 1 wt %, the amount of water miscible compound ranges from about 10 to 35 wt %, with the remainder of the formulation comprising water.

14. The ink jet ink formulation of claim 1, wherein the formulation comprises from about 3.5 to about 10 wt % solids.

15. The ink jet ink formulation of claim 14, wherein the water immiscible organic compound is comprised of dibutyl phthalate, and with the dibutyl phthalate comprising from 5 to 20 wt % of the formulation based upon the weight of solids.

16. A process for preparing the ink jet ink formulation of claim 1, wherein a dispersion of the components of the formulation is subjected to comminution followed by a separation step.

17. The process of claim 16, wherein additional water miscible compound is added subsequent to the separation step.

18. The process of claim 16, wherein the separation step comprises centrifugation.

19. The process of claim 16, wherein the comminution is such as to create a bimodal dispersion of the pigment particles, and the separation comprises separating out one of the modes.

20. The process of claim 16, wherein the comminution comprises passing the dispersion of component through a microfluidizer.

21. The process of claim 16, wherein the comminution results in a pigment in water microemulsion.

22. The process of claim 16, wherein the final ink formulation is filtered to remove particles greater than 1 micron in size.

23. The process of claim 22, wherein the final ink formulation is deaerated prior to the filter step.

24. A process for printing which comprises using the ink jet ink formulation of claim 1 in an ink jet printer, and applying the ink to a printing medium with the ink jet printer.

25. The process of claim 24, wherein the medium to which the ink is applied is coated ink jet paper.

26. The process of claim 24, wherein the medium to which the ink is applied is plain paper.

27. The process of claim 24, wherein the medium to which the ink is applied is paper suitable for outdoor use.

28. The process of claim 24, wherein the medium to which the ink is applied is a vinyl medium.

29. The process of claim 24, wherein the medium to which the ink is applied is an overhead transparency medium.

30. The process of claim 24, wherein the medium to which the ink is applied is a white polyester medium.

31. The process of claim 24, wherein the ink jet printer is a deskjet printer.

32. The process of claim 24, wherein the ink jet printer is a wide format printer.

* * * * *